United States Patent
Park et al.

(10) Patent No.: US 10,276,893 B2
(45) Date of Patent: Apr. 30, 2019

(54) GEL POLYMER ELECTROLYTE AND LITHIUM SECONDARY BATTERY COMPRISING THE SAME

(71) Applicant: LG Chem, Ltd., Seoul (KR)

(72) Inventors: Sol Ji Park, Daejeon (KR); Kyoung Ho Ahn, Daejeon (KR); Jeong Woo Oh, Daejeon (KR); Chul Haeng Lee, Daejeon (KR); Yi Jin Jung, Daejeon (KR)

(73) Assignee: LG Chem, Ltd. (KR)

(*) Notice: Subject to any disclaimer, the term of this patent is extended or adjusted under 35 U.S.C. 154(b) by 76 days.

(21) Appl. No.: 15/516,146

(22) PCT Filed: Oct. 1, 2015

(86) PCT No.: PCT/KR2015/010416
§ 371 (c)(1),
(2) Date: Mar. 31, 2017

(87) PCT Pub. No.: WO2016/053041
PCT Pub. Date: Apr. 7, 2016

(65) Prior Publication Data
US 2017/0309956 A1    Oct. 26, 2017

(30) Foreign Application Priority Data

Oct. 2, 2014 (KR) .................. 10-2014-0133469
Oct. 1, 2015 (KR) .................. 10-2015-0138643

(51) Int. Cl.
*C08G 73/02* (2006.01)
*H01M 4/525* (2010.01)
(Continued)

(52) U.S. Cl.
CPC ...... *H01M 10/0565* (2013.01); *C08G 73/024* (2013.01); *H01M 4/525* (2013.01);
(Continued)

(58) Field of Classification Search
CPC .......... H01M 10/0565; H01M 10/052; H01M 10/0525; H01M 4/525; H01M 4/587; H01M 2300/0085; C08G 73/024; C08G 2220/00

See application file for complete search history.

(56) References Cited

U.S. PATENT DOCUMENTS 5,240,791 A * 8/1993 Izuti .................... C08F 290/062
                                                                    252/62.2
5,429,793 A   7/1995 Ong et al.
(Continued)

FOREIGN PATENT DOCUMENTS

CN    103474697 A    12/2013
CN    103872379 A     6/2014
(Continued)

OTHER PUBLICATIONS

Extended European Search Report for Application No. EP15848091 dated Jul. 10, 2017.
(Continued)

*Primary Examiner* — Gregg Cantelmo
(74) *Attorney, Agent, or Firm* — Lerner, David, Littenberg, Krumholz & Mentlik, LLP (57) ABSTRACT

The present invention relates to a composition for a gel polymer electrolyte comprising a liquid electrolyte solvent, a lithium salt, a polymerization initiator, and a mixed compound of a first compound and a second compound, and a lithium secondary battery comprising a positive electrode, a negative electrode, a separator, and a gel polymer electrolyte, wherein the gel polymer electrolyte is formed by polymerizing the composition for a gel polymer electrolyte. By comprising a mixed compound of a first compound and a second compound in which the first compound is an amine-based compound comprising polyethylene glycol as a functional group and the second compound is an epoxy-
(Continued)

based compound, a composition for a gel polymer electrolyte of the present invention exhibits, when used in a lithium secondary battery, enhanced battery lifespan, excellent high temperature storability, and enhanced battery capacity property by readily inducing a hopping phenomenon.

11 Claims, 2 Drawing Sheets

(51) Int. Cl.
  *H01M 4/587* (2010.01)
  *H01M 10/052* (2010.01)
  *H01M 10/0525* (2010.01)
  *H01M 10/0565* (2010.01)

(52) U.S. Cl.
  CPC ......... *H01M 4/587* (2013.01); *H01M 10/052* (2013.01); *H01M 10/0525* (2013.01); *C08G 2220/00* (2013.01); *H01M 2300/0085* (2013.01)

(56) References Cited

U.S. PATENT DOCUMENTS

| | | | |
|---|---|---|---|
| 6,562,520 B1 | 5/2003 | Zhao et al. | |
| 6,727,024 B2* | 4/2004 | Kang | C08J 5/20 429/309 |
| 7,078,131 B2* | 7/2006 | Noh | H01M 2/0212 252/62.2 |
| 2002/0160271 A1 | 10/2002 | Frech et al. | |
| 2003/0044688 A1 | 3/2003 | Kang et al. | |
| 2012/0244427 A1 | 9/2012 | Hashimoto et al. | |
| 2013/0136998 A1 | 5/2013 | Hwang et al. | |
| 2013/0269781 A1 | 10/2013 | Ko et al. | |
| 2014/0186673 A1 | 7/2014 | Kwon et al. | |
| 2014/0220451 A1 | 8/2014 | Yu et al. | |
| 2015/0072244 A1 | 3/2015 | Chen et al. | |

FOREIGN PATENT DOCUMENTS

| | | |
|---|---|---|
| JP | H0869817 A | 3/1996 |
| JP | 2001332306 A | 11/2001 |
| JP | 2004214041 A | 7/2004 |
| JP | 2004525204 A | 8/2004 |
| KR | 100522685 B1 | 10/2005 |
| KR | 20080103459 A | 11/2008 |
| KR | 20130115687 A | 10/2013 |
| KR | 101346414 B1 | 1/2014 |
| KR | 20140097025 A | 8/2014 |
| KR | 20140097026 A | 8/2014 |
| WO | 2011071101 A1 | 6/2011 |
| WO | 2014098525 A1 | 6/2014 |

OTHER PUBLICATIONS

International Search Report from PCT/KR2015/010416, dated Dec. 28, 2015.
Chinese Search Report for Application No. CN201580053802.1 dated Sep. 3, 2018.

* cited by examiner

GEL POLYMER ELECTROLYTE AND LITHIUM SECONDARY BATTERY COMPRISING THE SAME

CROSS-REFERENCE TO RELATED APPLICATIONS

The present application is a national phase entry under 35 U.S.C. § 371 of International Application No. PCT/KR2015/010416, filed Oct. 1, 2015, published in Korean, which claims priority to and the benefits of Korean Patent Application No. 10-2014-0133469 filed with the Korean Intellectual Property Office on Oct. 2, 2014, and Korean Patent Application No. 10-2015-0138643 filed with the Korean Intellectual Property Office on Oct. 1, 2015, the entire contents of which are incorporated herein by reference.

FIELD OF THE INVENTION

Technical Field

The present invention relates to a gel polymer electrolyte and a secondary battery comprising the same.

Description of the Related Art

With increases in technology developments and demands for mobile devices, demands for secondary batteries as an energy source have rapidly increased, and among such secondary batteries, lithium secondary batteries having high energy density and voltage have been commercialized and widely used.

As a positive electrode active material of a lithium secondary battery, lithium metal oxides have been used, and as a negative electrode active material, lithium metal, lithium alloys, crystalline or amorphous carbon or carbon complexes have been used. A secondary battery is manufactured by applying the active material on a current collector to proper thickness and length or applying the active material itself in a film form, and winding or laminating the result with a separator, which is an insulator, to form an electrode group, then placing the result in a can or a container similar thereto, and then injecting a liquid electrolyte thereto.

As electrolytes for electrochemical devices such as batteries using an electrochemical reaction and electric double layer capacitors, electrolytes in a liquid state, particular, ion conducting organic liquid electrolytes dissolving salts in non-aqueous organic solvents have been mainly used in the art.

However, when using electrolytes in a liquid state as described above, electrode materials are degenerated, and an organic solvent is very likely to volatilize, and besides, stability problems such as combustion caused by an increase in the peripheral temperature and the temperature of a battery itself may occur. Particularly, lithium secondary batteries have a problem of expanding a battery thickness during charge and discharge since gas is generated inside the battery due to carbonate organic solvent decomposition and/or a side reaction between an organic solvent and electrodes, and during high temperature storage, such a reaction accelerates leading to an increase in the amount of gas generation.

The gas continuously generated as above induces an internal pressure increase in the battery and causes a phenomenon of deforming the center of a specific surface in the battery such as rising of a square shape battery in a specific direction, and also causes a problem of an electrode reaction not being able to identically occur over the whole electrode surface due to local differences in the adhesion in the electrode surface inside the battery. Accordingly, decline in the battery performance and safety is inevitably resulted.

Generally, safety of batteries is enhanced in order of liquid electrolyte<gel polymer electrolyte<solid polymer electrolyte, however, battery performance declines in this order. Due to such inferior battery performance, batteries employing solid polymer electrolytes have not been commercialized so far.

DISCLOSURE OF THE INVENTION

Technical Problem

In view of the above, the present invention is directed to providing a composition for a gel polymer electrolyte capable of enhancing a battery capacity property as well as enhancing a battery lifespan by comprising a mixed compound in a liquid electrolyte, and a lithium secondary battery comprising the same.

Technical Solution

One embodiment of the present invention provides a composition for a gel polymer electrolyte comprising a liquid electrolyte solvent, a lithium salt, a polymerization initiator; and a mixed compound of a first compound and a second compound.

The first compound may be an amine-based compound comprising polyethylene glycol as a functional group, and the second compound may be an epoxy-based compound.

Another embodiment of the present invention provides a lithium secondary battery comprising a positive electrode, a negative electrode, a separator and a gel polymer electrolyte, wherein the gel polymer electrolyte is formed by polymerizing the composition for a gel polymer electrolyte.

The gel polymer electrolyte may comprise oligomers represented by the following Chemical Formulae 1 and 2.

[Chemical Formula 1]

Herein, n and m are each an integer of 1 to 20, $R_1$ to $R_5$ are each independently hydrogen or —$CO(CH_2)_3COO$—$(CH_2CH_2O)x$-$CH_3$, x is an integer of 1 to 100, and at least 3 or more of $R_1$ to $R_5$ are —$CO(CH_2)_3COO$—$(CH_2CH_2O)_x$—$CH_3$.

[Chemical Formula 2]

Herein, a is an integer of 1 to 100.

Advantageous Effects

By comprising a mixed compound of a first compound and a second compound in which the first compound is an amine-based compound comprising polyethylene glycol as a functional group and the second compound is an epoxy-based compound, a composition for a gel polymer electrolyte of the present invention exhibits, when used in a lithium secondary battery, enhanced battery lifespan, excellent high temperature storability, and enhanced battery capacity property by readily inducing a hopping phenomenon.

MODE FOR CARRYING OUT THE INVENTION

Hereinafter, the present invention will be described in more detail in order to illuminate the present invention.

Terms or words used in the present specification and the claims are not to be interpreted limitedly to common or dictionary definitions, and shall be interpreted as meanings and concepts corresponding to technological ideas of the present invention based on a principle in which the inventors may suitably define the concepts of terms in order to describe the invention in the best possible way.

A composition for a gel polymer electrolyte according to one embodiment of the present invention comprises a liquid electrolyte solvent, a lithium salt, a polymerization initiator, and a mixed compound of a first compound and a second compound, wherein the first compound may be an amine-based compound comprising polyethylene glycol as a functional group, and the second compound may be an epoxy-based compound.

The first compound may specifically be polyimine comprising ethylene glycol, and examples thereof may comprise poly(ethylene imine)-graft-poly(ethylene glycol) (PEI-PEG) and the like. In addition, the second compound may be polyethylene glycol having two or more epoxy groups and examples thereof may comprise polyethylene diglycidyl ether and the like.

According to one embodiment of the present invention, by comprising a polyethylene glycol functional group comprised in the first compound in the mixed compound, solubility for the composition for a gel polymer electrolyte increases and the mixed compound may be stably fixed and present on a gel structure inside the gel polymer electrolyte, and by mixing the second compound comprising an epoxy-based compound thereto, a hopping phenomenon of FIG. 1 to be described later is more readily performed, and as a result, ion mobility of the gel polymer electrolyte produced from the polymerization reaction increases and an output property may be enhanced.

The first compound may be comprised in an amount of 1% by weight to 15% by weight, specifically 3% by weight to 12% by weight and more specifically 4% by weight to 10% by weight with respect to the total weight of the composition for a gel polymer electrolyte.

When the first compound is comprised in 1% by weight or greater with respect to the total weight of the composition for a gel polymer electrolyte, gelation of the composition for a gel polymer electrolyte may be more smoothly accomplished, and an increase in the battery thickness may decrease during high temperature storage due to enhancement in the high temperature storage property. The tendency is more striking when the content is specifically 3% by weight and more specifically 4% by weight. In addition, when the first compound is comprised in 15% by weight or less with respect to the total weight of the composition for a gel polymer electrolyte, an increase in the battery resistance caused by the excess content may be prevented while exhibiting effects of enhancing gelation and a high temperature storage property described above.

The weight ratio of the first compound and the second compound may be 1:0.2 to 0.6, and specifically 1:0.25 to 0.5.

When the first compound and the second compound satisfy a weight ratio of 1:0.2 to 0.6, gelation of the composition for a gel polymer electrolyte may be more smoothly accomplished, and an increase in the battery thickness may decrease since a high temperature storage property is enhanced, and a hopping phenomenon is more readily performed, and as a result, ion mobility of the gel polymer electrolyte produced from the polymerization reaction increases and an output property may be enhanced.

In addition, according to one embodiment of the present invention, when comprising the mixed compound in the composition for a gel polymer electrolyte, precipitation of metals in a negative electrode may be reduced since metal ions eluted from a positive electrode bond with the mixed compound, unlike cases using general liquid electrolytes in which metals ions eluted from a positive electrode are precipitated in a negative electrode. Accordingly, charge and discharge efficiency of a lithium secondary battery may be enhanced, and a favorable cycle property may be exhibited. Moreover, when using a composition for a gel polymer electrolyte comprising a monomer having the functional group in a lithium secondary battery, risks of leakage is small and a flame retarding property is obtained, which leads to enhancement in the battery stability.

The mixed compound of the first compound and the second compound may be comprised in 0.1% by weight to 10% by weight, and preferably in 0.5% by weight to 5% by weight with respect to the total weight of the composition for a gel polymer electrolyte. When the mixed compound is comprised in less than 0.1% by weight, gelation is difficult to be obtained and therefore, properties of the gel polymer electrolyte are difficult to be exhibited, and when the mixed compound is comprised in greater than 10% by weight, monomers are excessively comprised causing an increase in the resistance, and consequently, battery performance may decline.

According to one embodiment of the present invention, a polymerizable monomer may be prepared by mixing the first compound and the second compound and reacting the result for 2 minutes to 12 hours in a temperature range of 30° C. to 100° C. Herein, the content ratio of a monomer having a functional group and a branched monomer may be from 1:18 to 1:75 in a weight ratio, but the ratio is not limited thereto.

Figure 1:
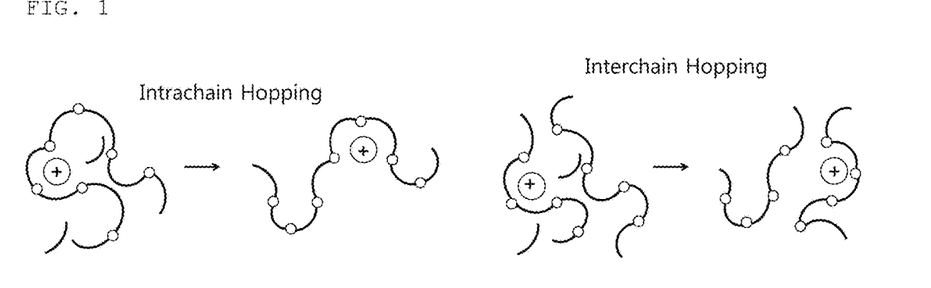
FIG. 1 is a diagram showing a principle of lithium ion migration when using a composition for a gel polymer electrolyte.

In such a gel polymer electrolyte, sizes of lithium ions are small and direct migration is relatively simple, and besides, migration using a hopping phenomenon is readily accomplished in a liquid electrolyte as shown in FIG. 1.

Examples of the ionizable lithium salt comprised in the composition for an electrolyte according to one embodiment of the present invention may comprise, but are not limited to, any one selected from the group consisting of LiPF$_6$, LiBF$_4$, LiSbF$_6$, LiAsF$_6$, LiClO$_4$, LiN(C$_2$F$_5$SO$_2$)$_2$, LiN(CF$_3$SO$_2$)$_2$, CF$_3$SO$_3$Li, LiC(CF$_3$SO$_2$)$_3$ and LiC$_4$BO$_8$, or a mixture of two or more thereof.

In addition, as the liquid electrolyte solvent used according to one embodiment of the present invention, those commonly used in liquid electrolytes for a lithium secondary battery may be used without limit, and for example, ether, ester, amide, linear carbonate, cyclic carbonate or the like may be used either alone or as a mixture of two or more thereof.

Among these, carbonate compounds such as cyclic carbonate, linear carbonate or a mixture thereof may be typically comprised.

Specific examples of the cyclic carbonate compound may comprise any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and halides thereof, or a mixture of two or more types thereof. In addition, specific examples of the linear carbonate compound may comprise, but are not limited to, any one selected from the group consisting of dimethyl carbonate (DMC), diethyl carbonate (DEC), dipropyl carbonate (DPC), ethylmethyl carbonate (EMC), methylpropyl carbonate (MPC) and ethylpropyl carbonate (EPC), or a mixture of two or more thereof.

Particularly, among the carbonate-based liquid electrolyte solvents, propylene carbonate and ethylene carbonate that are cyclic carbonate may be preferably used since they are highly viscous organic solvents and have a high dielectric constant, and therefore, favorably dissociate lithium salts in a liquid electrolyte, and mixing low viscous and low dielectric constant linear carbonate such as ethylmethyl carbonate, diethyl carbonate or dimethyl carbonate to such cyclic carbonate in a proper ratio is more preferable since liquid electrolytes having high electric conductivity is capable of being prepared.

In addition, as the ester in the liquid electrolyte solvent, any one selected from the group consisting of methyl acetate, ethyl acetate, propyl acetate, methyl propionate, ethyl propionate, γ-butyrolactone, γ-valerolactone, γ-caprolactone, α-valerolactone and ε-caprolactone, or a mixture of two or more thereof may be used, however, the ester is not limited thereto.

In the present invention, common polymerization initiators known in the art may be used as the polymerization initiator.

Nonlimiting examples of the polymerization initiator may comprise, but are not limited to, organic peroxides such as benzoyl peroxide, acetyl peroxide, dilauryl peroxide, di-tert-butyl peroxide, t-butyl peroxy-2-ethyl-hexanoate, cumyl hydroperoxide and hydrogen peroxide; hydroperoxides; and azo compounds such as 2,2'-azobis(2-cyanobutane), 2,2'-azobis(methyl butyronitrile), 2,2'-azobis(iso-butyronitrile) (AIBN) and 2,2'-azobisdimethyl-valeronitrile (AMVN).

In a battery, the polymerization initiator may form radicals by being decomposed by heat, as nonlimiting examples, heat of 30° C. to 100° C. or decomposed at room temperature (5° C. to 30° C.), and react with a polymerizable monomer by free-radical polymerization to form a gel polymer electrolyte.

In addition, the polymerization initiator may be used in an amount of 0.01% by weight to 2% by weight with respect to the total weight of the composition for a gel polymer electrolyte. The polymerization initiator being used in greater than 2% by weight is disadvantageous in that gelation may occur too quickly during the injection of the composition for a gel polymer electrolyte into a battery, or unreacted initiator remains having an adverse effect on the battery performance later, and the polymerization initiator being used in less than 0.01% by weight has a problem in that gelation does not readily occur.

The composition for a gel polymer electrolyte according to one embodiment of the present invention may selectively contain other additives and the like known in the art in addition to the above-described components.

Another embodiment of the present invention provides a lithium secondary battery comprising a positive electrode; a negative electrode; a separator; and a gel polymer electrolyte, wherein the gel polymer electrolyte is formed by polymerizing the composition for a gel polymer electrolyte. The gel polymer electrolyte according to one embodiment of the present invention may be formed by polymerizing the composition for a gel polymer electrolyte using common methods known in the art. For example, the gel polymer electrolyte may be formed by in-situ polymerization of the composition for a gel polymer electrolyte inside a secondary battery.

A more preferred embodiment may comprise (a) inserting an electrode assembly formed with a positive electrode, a negative electrode, and a separator provided between the positive electrode and the negative electrode into a battery case, and (b) forming a gel polymer electrolyte by injecting the composition for a gel polymer electrolyte according to the present invention to the battery case and then polymerizing the composition.

The in-situ polymerization reaction inside a lithium secondary battery may be progressed through thermal polymerization. Herein, the polymerization may take approximately 2 minutes to 12 hours, and a thermal polymerization temperature may be from 30° C. to 100° C.

A gel polymer electrolyte is formed after going through gelation using such a polymerization reaction. Specifically, an oligomer in which polymerizable monomers are cross-linked to each other by the polymerization reaction is formed, and a liquid electrolyte in which electrolyte salts are dissociated in a liquid electrolyte solvent may be uniformly impregnated into the formed oligomer.

The oligomer according to one embodiment of the present invention may have a mixed form of oligomers represented by the following Chemical Formulae 1 and 2.

[Chemical Formula 1]

Herein, n and m are each an integer of 1 to 20, $R_1$ to $R_5$ are each independently hydrogen or —CO(CH$_2$)$_3$COO—(CH$_2$CH$_2$O)x-CH$_3$, x is an integer of 1 to 100, and at least 3 or more of $R_1$ to $R_5$ are —CO(CH$_2$)$_3$COO—(CH$_2$CH$_2$O)$_x$—CH$_3$.

[Chemical Formula 2]

Herein, a is an integer of 1 to 100.

The lithium secondary battery according to one embodiment of the present invention has a charging voltage in a range of 3.0 V to 5.0 V, and a capacity property of the lithium secondary battery is excellent in both general voltage and high voltage regions.

According to one embodiment of the present invention, electrodes of the lithium secondary battery may be formed using common methods known in the art. For example, after preparing slurry by mixing a solvent, and as necessary, a binder, a conductor and a dispersion agent to an electrode active material and stirring the result, the slurry is applied (coated) on a current collector made of metal, and the result is compressed and dried to prepare an electrode.

According to one embodiment of the present invention, in the positive electrode, compounds that may be used at a general voltage or a high voltage, and capable of reversibly intercalating/deintercalating lithium may be used as the positive electrode active material without limit.

In the lithium secondary battery according to one embodiment of the present invention, examples of the positive electrode active material capable of being used at a general voltage may comprise, but are not limited to, any one selected from the group consisting of $LiCoO_2$, $LiNiO_2$, $LiMnO_2$, $LiMn_2O_4$, $LiNi_{1-y}Co_yO_2$ ($0=y<1$), $LiCo_{1-y}Mn_yO_2$ ($0=y<1$), $LiNi_{1-y}Mn_yO_2$ ($0=y<1$), and $Li[Ni_aCo_bMn_c]O_2$ ($0<a, b, c=1, a+b+c=1$), or a mixture of two or more types thereof. In addition, sulfides, selenides and halides and the like may be also comprised in addition to such oxides.

Meanwhile, in the lithium secondary battery according to one embodiment of the present invention, carbon materials capable of intercalating and deintercalating lithium ions, lithium metal, silicon, tin or the like may be commonly used as the negative electrode active material. Carbon materials may be preferably used, and low crystalline carbon, high crystalline carbon and the like may all be used as the carbon material. Low crystalline carbon may typically comprise soft carbon and hard carbon, and high crystalline carbon may typically comprise natural graphite, Kish graphite, pyrolytic carbon, mesophase pitch based carbon fiber, mesocarbon microbeads, mesophase pitches, and high-temperature baked carbon such as petroleum or coal tar pitch derived cokes.

The positive electrode and/or the negative electrode may be prepared by preparing slurry through mixing a binder, a solvent, and as necessary, a conductor and a dispersion agent that may be commonly used and then stirring the result, and applying the slurry on a current collector and compressing the result.

As the binder, various types of binder polymers such as a polyvinylidene fluoride-hexafluoropropylene copolymer (PVDF-co-HEP), polyvinylidene fluoride, polyacrylonitrile, polymethyl methacrylate, polyvinyl alcohol, carboxymethylcellulose (CMC), starch, hydroxypropylcellulose, regenerated cellulose, polyvinylpyrrolidone, tetrafluoroethylene, polyethylene, polypropylene, polyacrylic acid, an ethylene-propylene-diene monomer (EPDM), a sulfonated EPDM, styrene-butadiene rubber (SBR), fluorine rubber and various copolymers may be used.

In addition, as the separator, common porous polymer films used as separators in the art, for example, a porous polymer film prepared with a polyolefin-based polymer such as an ethylene homopolymer, a propylene homopolymer, an ethylene/butene copolymer, an ethylene/hexene copolymer and an ethylene/methacrylate copolymer may be used either alone or as laminates thereof, or common porous non-woven fabrics, for example, non-woven fabrics made of high melting point glass fiber, polyethylene terephthalate fiber or the like may be used, however, the separator is not limited thereto.

An appearance of the lithium secondary battery according to one embodiment of the present invention is not particularly limited, and a cylinder-type, a square-type, a pouch-type or a coin-type using a can, or the like, may be comprised.

Hereinafter, the present invention will be described in detail with reference to examples. However, the examples according to the present invention may be modified to various other forms, and the scope of the present invention should not be construed as being limited to the examples described below. The examples of the present invention are provided in order to more completely describe the present invention for those having average knowledge in the art.

EXAMPLE

Example 1: Preparation of Composition for Gel Polymer Electrolyte

A liquid electrolyte was prepared by dissolving $LiPF_6$ in a non-aqueous liquid electrolyte solvent having a composition of ethylene carbonate (EC):ethylmethyl carbonate (EMC)=1:2 (volume ratio) so that the concentration became 1 M. With respect to the total weight of the composition for an electrolyte with the weight of the liquid electrolyte, 0.25% by weight of t-butyl peroxy-2-ethyl hexanoate was added thereto as a polymerization initiator, and 2% by weight of poly(ethylene imine)-graft-poly(ethylene glycol) (PEI-PEG) was added thereto as a first compound, and polyethylene glycol diglycidyl ether was added thereto as a second compound in an amount of ⅓% by weight with respect to the first compound. As a result, a composition for a gel polymer electrolyte was prepared.

Example 2: Preparation of Composition for Gel Polymer Electrolyte

A composition for a gel polymer electrolyte was prepared in the same manner as in Example 1, except that poly(ethylene imine)-graft-poly(ethylene glycol) (PEI-PEG) was used in an amount of 5% by weight as the first compound, and polyethylene glycol diglycidyl ether was used as the second compound in an amount of ⅓% by weight with respect to the first compound.

Example 3: Preparation of Composition for Gel Polymer Electrolyte

A composition for a gel polymer electrolyte was prepared in the same manner as in Example 1, except that poly(ethylene imine) (PEI) was used instead of poly(ethylene imine)-graft-poly(ethylene glycol) (PEI-PEG) as the first compound.

Example 4: Preparation of Composition for Gel Polymer Electrolyte

A composition for a gel polymer electrolyte was prepared in the same manner as in Example 2, except that poly(ethylene imine) (PEI) was used instead of poly(ethylene imine)-graft-poly(ethylene glycol) (PEI-PEG) as the first compound.

Example 5: Manufacture of Secondary Battery

Preparation of Positive Electrode

Positive electrode mixture slurry was prepared by adding 94% by weight of $LiCoO_2$ as a positive electrode active material, 3% by weight of carbon black as a conductor and 3% by weight of PVdF as a binder to N-methyl-2-pyrrolidone (NMP), a solvent. The positive electrode mixture slurry was applied on an aluminum (Al) thin film, a positive electrode current collector, having a thickness of approximately 20 μm, and the result was dried and roll pressed to prepare a positive electrode.

Preparation of Negative Electrode

Negative electrode mixture slurry was prepared by adding 96% by weight of carbon powder as a negative electrode active material, 3% by weight of PVdF as a binder, and 1% by weight of carbon black as a conductor to NMP, a solvent. The negative electrode mixture slurry was applied on a copper (Cu) thin film, a negative electrode current collector, having a thickness of 10 μm, and the result was dried and roll pressed to prepare a negative electrode.

Manufacture of Battery

A battery was assembled using the positive electrode, the negative electrode and a separator formed with three layers of polypropylene/polyethylene/polypropylene (PP/PE/PP), and the composition for a gel polymer electrolyte prepared in Example 1 was injected to the assembled battery. Then the result was heated for 20 minutes to 30 minutes at 80° C. to manufacture a secondary battery.

Examples 6 to 8: Manufacture of Secondary Battery

Secondary Batteries were each manufactured in the same manner as in Example 5 except that the compositions for a gel polymer electrolyte prepared in Examples 2 to 4 were used instead of the composition for a gel polymer electrolyte prepared in Example 1.

Test Example 1: Comparison of Gel Electrolyte Production Reaction

The compositions for a gel polymer electrolyte prepared in Examples 1 to 4 were cured at 65° C. to observe the occurrence of gelation, and the results are shown in the following Table 1.

TABLE 1

|   | First Compound | Second Compound | Added Amount | Gelation Status |
|---|---|---|---|---|
| Example 1 | poly(ethyleneimine)-graft-poly(ethylene glycol) (PEI-PEG) | Polyethylene glycol diglycidyl ether | First compound: 2% by weight Second compound: ⅓% by weight with respect to first compound | Gelated |
| Example 2 | poly(ethyleneimine)-graft-poly(ethylene glycol) (PEI-PEG) | Polyethylene glycol diglycidyl ether | First compound: 5% by weight Second compound: ⅓% by weight with respect to first compound | Gelated |
| Example 3 | poly(ethyleneimine) (PEI) | Polyethylene glycol diglycidyl ether | First compound: 2% by weight Second compound: ⅓% by weight with respect to first compound | Gelated |
| Example 4 | poly(ethyleneimine) (PEI) | Polyethylene glycol diglycidyl ether | First compound: 5% by weight Second compound: ⅓% by weight with respect to first compound | Not Gelated |

As shown in Table 1, the composition for a gel polymer electrolyte comprising a mixed compound using poly(ethylene imine)-graft-poly(ethylene glycol) (PEI-PEG) as the first compound and polyethylene glycol diglycidyl ether as the second compound all experienced smooth gelation in both cases of having the first compound content of 2% by weight and the second compound content of ⅓% by weight with respect to the first compound (Example 1), and having the first compound content of 5% by weight and the second compound content of ⅓% by weight with respect to the first compound. Meanwhile, the composition for a gel polymer electrolyte comprising a mixed compound using poly(ethylene imine) (PEI) as the first compound and polyethylene glycol diglycidyl ether as the second compound experienced smooth gelation in Example 3 having the first compound content of 2% by weight and the second compound content of ⅓% by weight with respect to the first compound, but no gelation occurred in Example 4 having the first compound content of 5% by weigh and the second compound content of ⅓% by weight with respect to the first compound.

Test Example 2: Evaluation on Secondary Battery Capacity

Each of the secondary batteries manufactured in Examples 5 to 7 was charged with a rate (C-rate) of 0.1 C (unit: mA/g) until the voltage reached 4.4 V, and was further charged until the current reached 0.05 C under a constant voltage condition of 4.4 V. After that, the batteries were rested for 10 minutes. Subsequently, each of the batteries was discharged with a rate of 0.3 C until the voltage reached 2.8 V. Each discharge capacity was measured and the results are shown in Table 2, and as for the battery of Example 8 experiencing no gelation, no tests were carried out.

TABLE 2

|  | Designed Capacity | Example 5 | Example 6 | Example 7 |
|---|---|---|---|---|
| 0.3 C Discharge | 37.8 mAh | 36.1 mAh | 35.7 mAh | 35.2 mAh |

As identified in Table 2, the secondary batteries using the composition for a gel polymer electrolyte comprising a mixed compound of the first compound and the second compound exhibited an excellent capacity property, and particularly, when comprising poly(ethylene imine)-graft-poly(ethylene glycol) (PEI-PEG), an amine-based compound that comprises a polyethylene glycol functional group, as the first compound (Example 5), a more superior capacity property was exhibited compared to when comprising poly(ethylene imine) (PEI), an amine-based compound that does not comprise a polyethylene glycol functional group, (Example 7), even when the first compound content and the second compound content were the same.

Test Example 3: Evaluation on High Temperature Storage Property

After measuring a thickness of each of the secondary batteries manufactured in Examples 5 to 7, each of the secondary batteries was placed in a chamber at a temperature of 60° C., and stored for 3 weeks. The thicknesses were measured again, compared with the thicknesses prior to the storage, and then calculated. The results are shown in FIG. 2.

Figure 2:
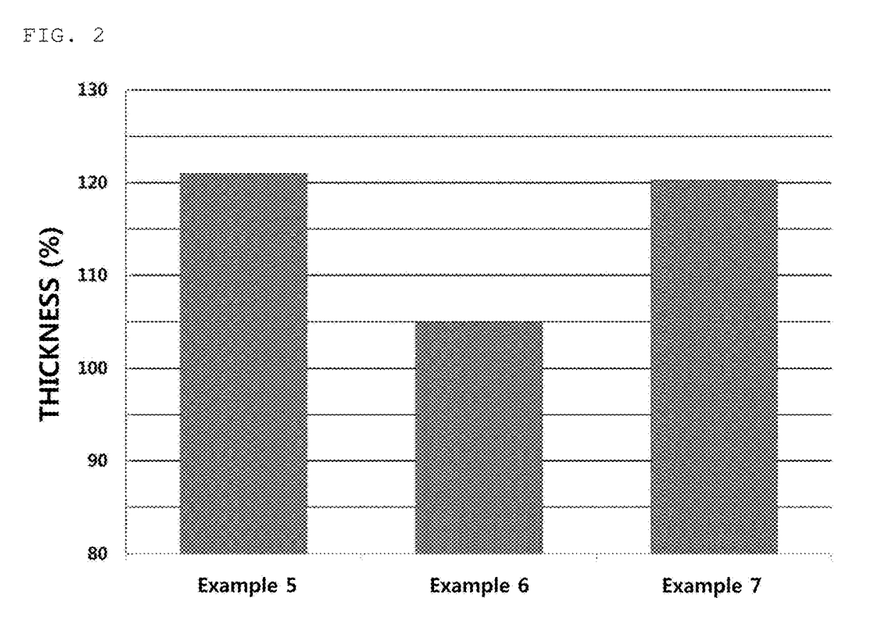
FIG. 2 is a graph showing a degree of thickness increase after storing secondary batteries manufactured in Examples 5 to 7 at a high temperature.

Referring to FIG. 2, the secondary battery gelated using poly(ethylene imine)-graft-poly(ethylene glycol) (PEI-PEG), an amine-based compound that comprises a polyethylene glycol functional group, as the first compound (Example 6) had a reduced thickness increase during the high temperature storage and thereby exhibited excellent high temperature storage efficiency compared to the secondary battery gelated using poly(ethylene imine) (PEI), an amine-based compound that does not comprise a polyethylene glycol functional group (Example 7).

What is claimed is:

1. A composition for a gel polymer electrolyte comprising a liquid electrolyte solvent, a lithium salt, a polymerization initiator; and a mixed compound of a first compound and a second compound,
    wherein the first compound is an amine-based compound comprising polyethylene glycol as a functional group, and
    wherein the second compound is an epoxy-based compound.

2. The composition for a gel polymer electrolyte of claim 1, wherein the mixed compound is comprised in an amount of 0.1% by weight to 10% by weight with respect to a total weight of the composition.

3. The composition for a gel polymer electrolyte of claim 1, wherein a weight ratio of the first compound and the second compound is 1:0.2 to 1:0.6.

4. The composition for a gel polymer electrolyte of claim 1, wherein the lithium salt is any one selected from the group consisting of $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$ and $LiC_4BO_8$, or a mixture of two or more thereof.

5. The composition for a gel polymer electrolyte of claim 1, wherein the liquid electrolyte solvent is linear carbonate, cyclic carbonate or a combination thereof.

6. The composition for a gel polymer electrolyte of claim 5, wherein the linear carbonate comprises any one selected from the group consisting of dimethyl carbonate, diethyl carbonate, dipropyl carbonate, ethylmethyl carbonate, methylpropyl carbonate and ethylpropyl carbonate, or a mixture of two or more types thereof, and the cyclic carbonate comprises any one selected from the group consisting of ethylene carbonate, propylene carbonate, 1,2-butylene carbonate, 2,3-butylene carbonate, 1,2-pentylene carbonate, 2,3-pentylene carbonate, vinylene carbonate, and halides thereof, or a mixture of two or more types thereof.

7. The composition for a gel polymer electrolyte of claim 1, wherein the polymerization initiator is one or more types selected from the group consisting of organic peroxides such as benzoyl peroxide, acetyl peroxide, dilauryl peroxide, di-tert-butyl peroxide, t-butyl peroxy-2-ethyl-hexanoate, cumyl hydroperoxide and hydrogen peroxide; hydroperoxides; and azo compounds such as 2,2'-azobis(2-cyanobutane), 2,2'-azobis(methylbutyronitrile), 2,2'-azobis(iso-butyronitrile) (AIBN) and 2,2'-azobisdimethyl-valeronitrile (AMVN).

8. A lithium secondary battery comprising a positive electrode; a negative electrode; a separator; and a gel polymer electrolyte,
    wherein the gel polymer electrolyte is formed by polymerizing the composition for a gel polymer electrolyte of claim 1.

9. The lithium secondary battery of claim 8, wherein the gel polymer electrolyte comprises oligomers represented by the following Chemical Formulae 1 and 2:

[Chemical Formula 1]

wherein, n and m are each an integer of 1 to 20, $R_1$ to $R_5$ are each independently hydrogen or —CO(CH$_2$)$_3$COO—(CH$_2$CH$_2$O)x-CH$_3$, x is an integer of 1 to 100, and at least 3 or more of $R_1$ to $R_5$ are —CO(CH$_2$)$_3$COO—(CH$_2$CH$_2$O)$_x$—CH$_3$;

[Chemical Formula 2]

Wherein, a is an integer of 1 to 100.

10. The lithium secondary battery of claim 8, which has a charging voltage of 3.0 V to 5.0 V.

11. The lithium secondary battery of claim 8, wherein the positive electrode comprises a positive electrode active material, and the positive electrode active material is any one selected from the group consisting of $LiCoO_2$, $LiNiO_2$, $LiMnO_2$, $LiMn_2O_4$, $LiNi_{1-y}Co_yO_2$ ($0 \le y<1$), $LiCo_{1-y}Mn_yO_2$ ($0 \le y<1$), $LiNi_{1-y}Mn_yO_2$ ($0 \le y<1$), and $Li[Ni_aCo_bMn_c]O_2$ ($0<a, b, c=1, a+b+c=1$), or a mixture of two or more thereof.

* * * * *